United States Patent [19]

Lee et al.

[11] Patent Number: 5,143,347
[45] Date of Patent: Sep. 1, 1992

[54] REVOLVABLE QUICK COUPLING

[76] Inventors: Yeong D. Lee; Yeong H. Lee, both of 2F, No. 29, Lane 89, Hsin Sheng Street, Pan Chiao City, Taipei Hsien, Taiwan

[21] Appl. No.: 820,387
[22] Filed: Jan. 14, 1992
[51] Int. Cl.[5] .............................................. F16L 37/28
[52] U.S. Cl. .................................. 251/149.6; 285/317; 285/276
[58] Field of Search .................. 251/149, 149.1, 149.5, 251/149.6; 285/317, 276, 277

[56] References Cited

U.S. PATENT DOCUMENTS

| 2,069,434 | 2/1937 | Eastman | 251/149.1 X |
| 2,459,477 | 1/1949 | Van Schuyver | 251/149.5 X |
| 4,493,475 | 1/1985 | Baird | 251/149.1 |
| 4,500,119 | 2/1985 | Geberth, Jr. | 285/276 |
| 4,557,261 | 12/1985 | Rügheimer | 285/317 X |
| 4,613,112 | 9/1986 | Phlipot et al. | 251/149.6 |

Primary Examiner—Martin P. Schwadron
Assistant Examiner—Kevin L. Lee
Attorney, Agent, or Firm—Morton J. Rosenberg; David I. Klein

[57] ABSTRACT

For connecting an air compressor to a pneumatic tool, a revolvable quick coupling comprising a first air pipe connector revolvably secured to an intermediate connecting member by a ball bearing means and connected to an air output pipe of an air compressor, a second air pipe connector secured to said intermediate connecting member by a front socket, a retainer, an inner socket, a seal ring, a stepped metal element and a spring means for connecting to an air input pipe of a pneumatic tool. Pressing on the retainer causes the second air pipe connector to disconnect from the front socket and simultaneously causes said seal ring to seal the air passage inside the coupling. Rotating the pneumatic tool causes the second air pipe connector to rotate on the first air pipe connector without twisting the air output pipe of the air compressor.

1 Claim, 4 Drawing Sheets

REVOLVABLE QUICK COUPLING

BACKGROUND OF THE INVENTION

The present invention relates to quick couplings and relates more particularly to a revolvable quick coupling for connecting an air pipe from an air compressor to a pneumatic tool, which automatically seal off the air passage therein once a pneumatic tool is detached and, which follows a pneumatic tool to rotate on a second air pipe connector without twisting the air pipe from of the connected air compressor.

Various quick connectors have been known and used in connecting air compressors to pneumatic tools. However, the known quick connectors are not satisfactory in use because neither one of them can be rotated by a pneumatic tool. If a quick connector is rotated by a pneumatic tool, the air pipe which is connected thereto will be twisted and damaged causing air leakage problem. The present invention has been accomplished to eliminate this problem.

SUMMARY OF THE INVENTION

According to the present invention, there is provided a revolvable quick coupling comprised of a first air pipe connector revolvably secured to an intermediate connecting member by a ball bearing means and connected to an air output pipe of an air compressor, a second air pipe connector secured to the intermediate connecting member by a front socket, a retainer, an inner socket, a seal ring, a stepped metal element and a spring means for connecting to an air input pipe of a pneumatic tool, wherein pressing on the retainer causes the second air pipe connector to disconnect from the front socket and simultaneously causes the seal ring to seal the air passage inside the coupling; rotating the pneumatic tool causes the second air pipe connector to rotate on the first air pipe connector without twisting the air output pipe of the air compressor.

DETAILED DESCRIPTION OF THE PREFERRED EMBODIMENT

Figure 1:
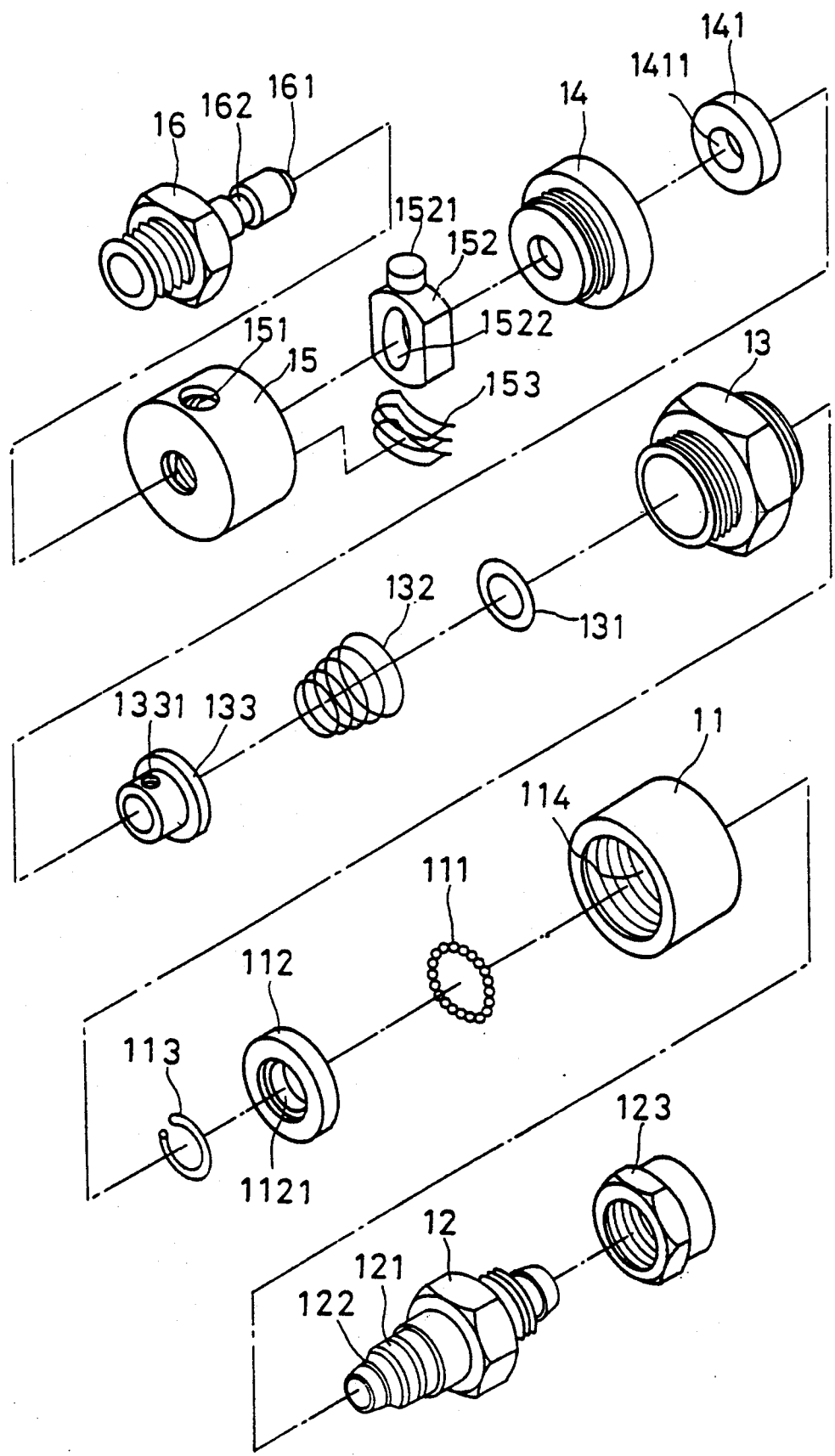
FIG. 1 is an exploded perspective view of the preferred embodiment of the revolvable quick coupling of the present invention.
Figure 2:
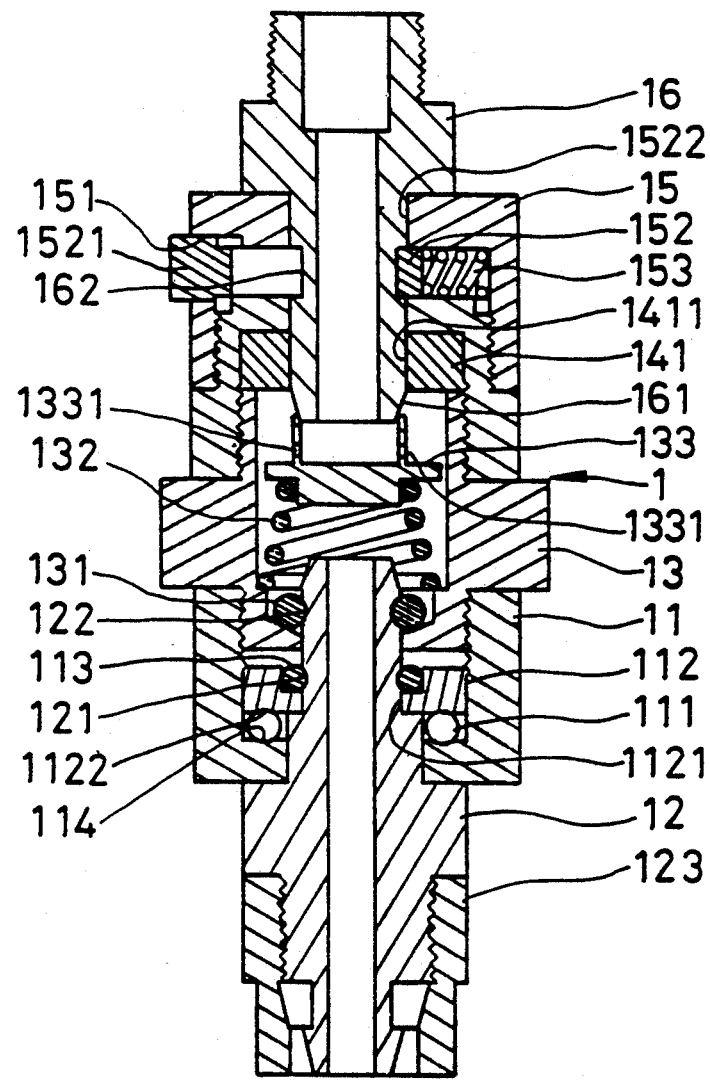
FIG. 2 is a sectional assembly view thereof.
Figure 3:
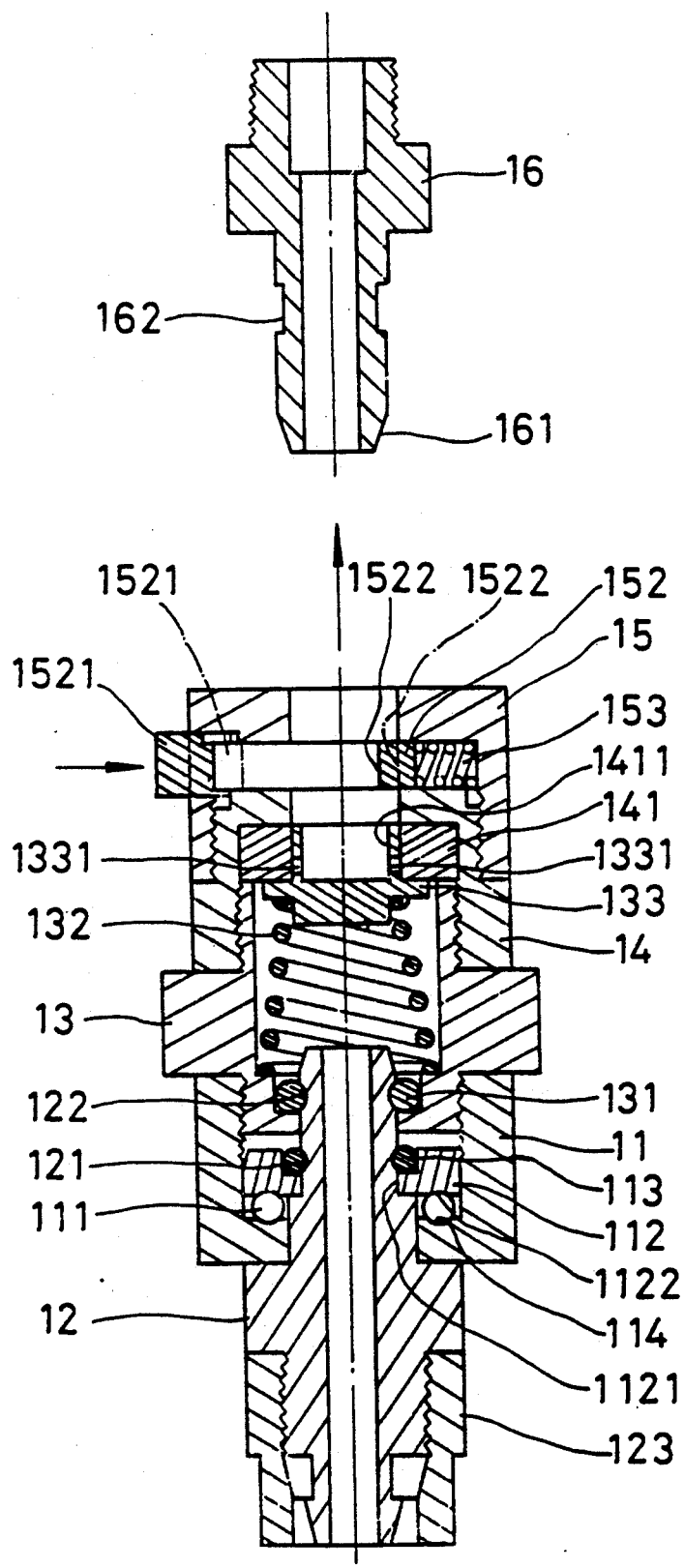
FIG. 3 is another cross section of the revolvable quick coupling showing that pressing the retainer causes the front air pipe connector to disconnect from the front socket.
Figure 5:
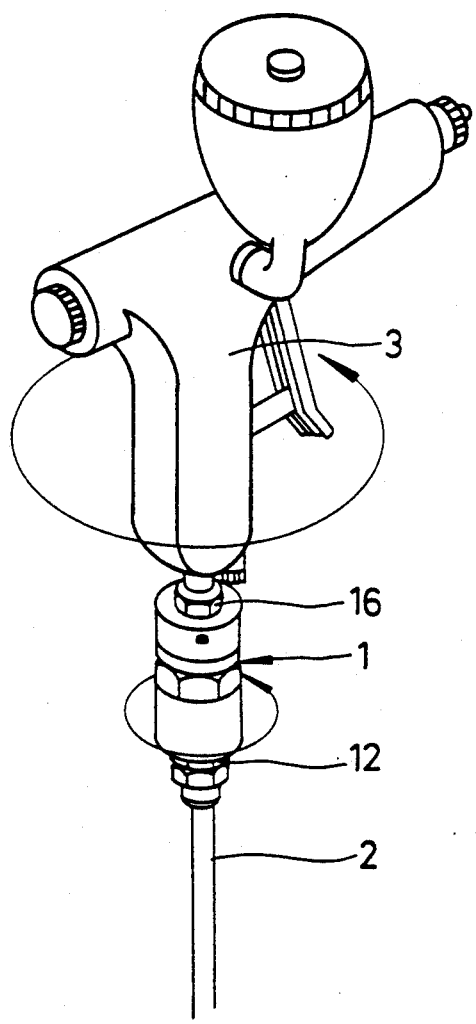
FIG. 5 illustrates that rotating a pneumatic tool causes the quick coupling to rotate on the rear air pipe connector without twisting the air pipe.
Figure 4:
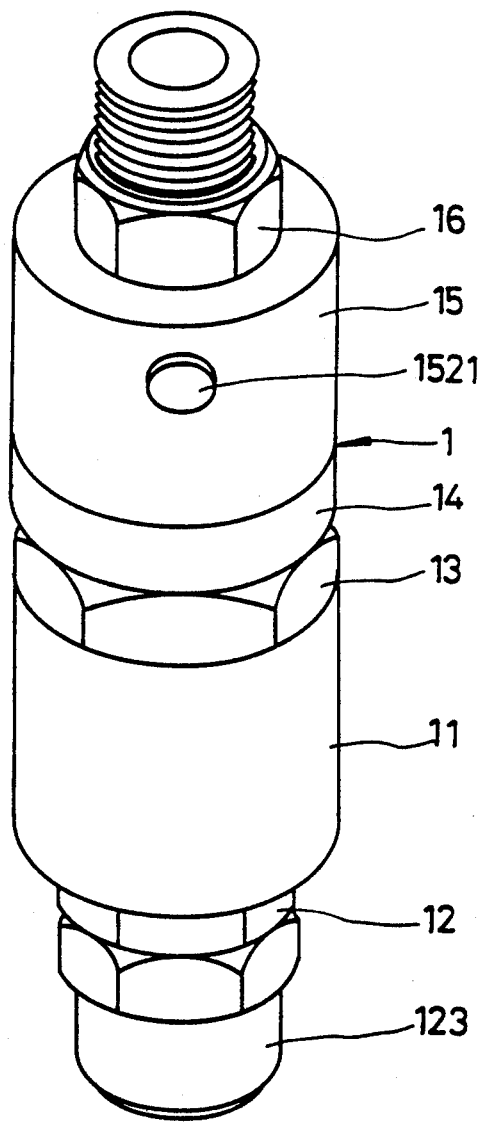
FIG. 4 is an elevational view of the revolvable quick coupling.

Referring to FIGS. 1, 2, 3 and 4, a rear socket 11 has an annular groove 114 at the inside for holding a plurality of rolling balls 111. A rotary ring 112 is supported on the rolling balls 111 inside the rear socket 11. The rotary ring 112 has an annular groove 1122 on a bottom edge thereof for holding the rolling balls 111, and a center hole 1121 through the central axis thereof for inserting a rear air pipe connector 12. The rear air pipe connector 12 has two annular grooves 121, 122 with one 121 rising behind the other 122. The annular groove 121 is inserted through the rear socket 11 and the center hole 1211 of the rotary ring 112 and secured in place by a C-shaped retainer ring 113. The rear socket 11 is mounted on an intermediate connecting member 13 at one end. A rubber ring 131 is inserted into the intermediate connecting member 13 and sleeved onto the front annular groove 122 of the rear air pipe connector 12 to seal the gap between the rear air pipe connector 12 and the intermediate connecting member 13. A movable stepped metal element 133 which has an air hole 1331 is inserted into the intermediate connecting member 13 and supported on a spring 132 therein. An inner socket 14 is mounted on the intermediate connecting member 13 at its opposite end to hold the stepped metal element 133 and the spring 132 inside the intermediate connecting member 13. A ring-shaped rubber insert 141 which has a center hole 1411 through the central axis thereof is inserted inside the inner socket 14 and sleeved on the stepped metal element 133 to seal the air hole 1331. A retainer 152 is positionally located and slidable within a grove 151 formed in a front socket 15 and supported on a spring 153 retained therein. The retainer 152 which is supported on the spring 153 has an oval hole 1522 through the center thereof and a stub rod 1521 at one end. The stub rod 1521 of the retainer 152 is constantly extended out of the pivot hole 151. There is also provided a front air pipe connector 16 which has a tapered terminal 161 at one end and an annular groove 162 at a suitable location. Inserting the tapered terminal 161 of the front air pipe connector 16 through a center hole 1511 on the front socket 15 causes the oval hole 1522 to retain the annular groove 162, and therefore, the front air pipe connector 16 becomes firmly secured to the quick coupling 1. At the same time, the stepped metal element 133 is pushed backwards by the tapered terminal 161 of the front air pipe connector 16 causing the air hole 1331 to move away from the ring-shaped rubber insert 141, and therefore, a flow of gas is permitted to pass through the air hole 1331 into the front air pipe connector 16. Pressing the stub rod 1521 of the retainer 152 causes the front air pipe connector 16 to be released from the constraint of the oval hole 1522 on the retainer 152, and therefore, the front air pipe connector 16 is immediately pushed out of the quick coupling 1 by the spring 132 and the stepped metal element 133. Once the front air pipe connector 16 is disconnected from the quick coupling 1, the stepped metal element 133 is simultaneously moved into the center hole 1411 of the ring-shaped rubber insert 141, and therefore, the air hole 1331 is sealed up again to stop the flow of gas from passing therethrough. When a pneumatic tool 3 is connected to the front air pipe connector 16, a flow of compressed air can be guided from a compressor (not shown) through an air pipe into the pneumatic tool 3 for operation. Rotating the pneumatic tool 3 causes the front air pipe connector 16 to rotate relative to the rear air pipe connector 12, and therefore, the air pipe 2 will not be twisted or damaged (see FIG. 5).

What is claimed is:

1. A revolvable quick coupling for connecting two air pipes together, the improvement comprising:

an intermediate connecting member, said intermediate connecting member having a through hole through a central axis thereof;

a rear socket mounted on said intermediate connecting member at one end, said rear socket having a plurality of rolling balls on an annular groove thereof at the inside;

a rotary ring revolvably set inside said rear socket and supported on said rolling balls;

a first air pipe connector connected, to an air compressor by an air pipe, said first air pipe connector having a unitary stepped tube at one end inserted through said rear socket and said rotary ring, said stepped tube having a first annular groove rising behind a second annular groove, said first annular groove being secured to said rotary ring by a C-shaped retainer ring;

a seal ring mounted on said second annular groove to seal up the gap between said first air pipe connector and said rear socket;

a first spring means received in the through hole inside said intermediate connecting member and supported on said first air pipe connector;

a stepped metal element received in the through hole inside said intermediate connecting member and supported on said first spring means, said stepped metal element having an air hole on a peripheral wall thereof;

an inner socket mounted on said intermediate connecting member at an opposite end thereof;

a rubber ring received inside said inner socket and mounted on said stepped metal element to seal up said air hole;

a front socket mounted on said inner socket, said front socket having a pivot hole on a peripheral wall thereof;

a retainer positionally located and slidable within a groove formed within said front socket and supported on a second spring means, said retainer having an oval hole through a body thereof and a stub rod at one end extended out of the pivot hole on said front socket;

a second air pipe connector for connecting said first air pipe connector to a pneumatic tool, said second air pipe connector having an annular groove on a tapered end thereof inserted through said front socket and retained within said oval hole; and wherein inserting said second air pipe connector into said front socket causes said air hole on said stepped metal element to be released from said seal ring for passing a flow of compressed air; pressing on said stub rod causes said second air pipe connector to be released from the constraint of said oval hole on said retainer permitting said second air pipe connector to be removed from said front socket; rotating the pneumatic tool which is connected to said second air pipe connector causes said second air pipe connector to rotate on said first air pipe connector.

* * * * *